United States Patent
Darden et al.

(10) Patent No.: US 11,038,750 B2
(45) Date of Patent: Jun. 15, 2021

(54) MANAGEMENT OF CONFIGURATION MODIFICATIONS IN DISTRIBUTED DATA SYSTEMS

(71) Applicant: Toshiba Global Commerce Solutions Holdings Corporation, Tokyo (JP)

(72) Inventors: Zachary M. Darden, New Hill, NC (US); Abhishekh Padmanabhan, Cary, NC (US); Jonathan Waite, Cary, NC (US); Adam Archambault, Apex, NC (US); Andrei Khaitas, McKinney, TX (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/661,673

(22) Filed: Oct. 23, 2019

(65) Prior Publication Data
US 2021/0126825 A1 Apr. 29, 2021

(51) Int. Cl.
*G06F 15/16* (2006.01)
*H04L 12/24* (2006.01)
*H04L 29/08* (2006.01)

(52) U.S. Cl.
CPC .......... *H04L 41/0803* (2013.01); *H04L 41/22* (2013.01); *H04L 67/10* (2013.01)

(58) Field of Classification Search
CPC ...... H04L 41/0803; H04L 41/22; H04L 67/10
See application file for complete search history.

(56) References Cited

U.S. PATENT DOCUMENTS

| | | | | |
|---|---|---|---|---|
| 5,950,230 | A | * 9/1999 | Islam | G06F 13/10 710/10 |
| 6,092,189 | A | * 7/2000 | Fisher | G06F 8/71 713/1 |
| 8,280,930 | B1 | * 10/2012 | Wei | G06F 3/0689 707/822 |
| 10,038,808 | B1 | * 7/2018 | Bhaskaran | H04N 1/00973 |
| 2003/0004952 | A1 | * 1/2003 | Nixon | G05B 19/4145 |
| 2006/0046717 | A1 | * 3/2006 | Bovell | H04W 8/245 455/432.3 |
| 2006/0085526 | A1 | * 4/2006 | Gulland | H04L 41/085 709/221 |
| 2006/0242694 | A1 | * 10/2006 | Gold | H04L 63/1441 726/13 |
| 2006/0282638 | A1 | * 12/2006 | Oshima | G06F 3/0632 711/170 |

(Continued)

*Primary Examiner* — Hieu T Hoang
(74) *Attorney, Agent, or Firm* — Patterson + Sheridan, LLP (57) ABSTRACT

Techniques for configuration management are provided. A plurality of configurations is received, where each of the plurality of configurations corresponds to a respective service and is associated with a first plan. The plurality of configurations is stored, in association with the first plan, without implementing the plurality of configurations. Upon receiving approval of the first plan, the first plan is implemented by, for each respective configuration of the plurality of configurations: identifying a respective corresponding service for the respective configuration and modifying a configuration of the respective corresponding service based on the respective configuration. Upon completing implementation of the first plan, each of the plurality of configurations is labeled with a production identifier.

20 Claims, 5 Drawing Sheets

(56) References Cited

U.S. PATENT DOCUMENTS

| | | | |
|---|---|---|---|
| 2007/0289008 A1* | 12/2007 | Andreev | H04L 41/22 |
| | | | 726/12 |
| 2010/0157988 A1* | 6/2010 | Takeuchi | H04L 65/1053 |
| | | | 370/352 |
| 2013/0295877 A1* | 11/2013 | Leemet | H04W 4/24 |
| | | | 455/405 |
| 2015/0066574 A1* | 3/2015 | Matsuura | G06Q 10/0633 |
| | | | 705/7.27 |
| 2015/0201089 A1* | 7/2015 | Raleigh | H04M 15/70 |
| | | | 455/414.1 |
| 2015/0324135 A1* | 11/2015 | Chan | G06F 3/0653 |
| | | | 711/114 |
| 2015/0378774 A1* | 12/2015 | Vermeulen | G06F 9/466 |
| | | | 707/703 |
| 2016/0050113 A1* | 2/2016 | Sridhara | H04L 67/1097 |
| | | | 709/221 |
| 2016/0173329 A1* | 6/2016 | Latham | H04L 12/467 |
| | | | 370/254 |
| 2017/0249570 A1* | 8/2017 | Shukla | G06Q 10/103 |
| 2017/0272321 A1* | 9/2017 | Ramos da Rocha | |
| | | | H04L 41/0816 |
| 2019/0391798 A1* | 12/2019 | Farrell | G06F 8/60 |
| 2020/0084117 A1* | 3/2020 | Kramar | H04L 41/22 |

* cited by examiner

MANAGEMENT OF CONFIGURATION MODIFICATIONS IN DISTRIBUTED DATA SYSTEMS

BACKGROUND

The present disclosure relates to configuration of distributed systems, and more specifically, to staged modification of configurations in distributed systems.

Configuration changes to services can rapidly become unworkable, particularly as the number of services, and the number of data nodes, grows. Existing solutions typically rely on manual management of configurations in order to ensure the system operations remain effective and consistent. There are few, if any, systems in place today to ensure that distributed nodes, each offering any number of services, remain aligned in their configurations and operations.

SUMMARY

According to one embodiment of the present disclosure, a method is provided. The method includes receiving a first plurality of configurations, wherein each of the first plurality of configurations corresponds to a respective service and is associated with a first plan. The method further includes storing the first plurality of configurations, in association with the first plan, without implementing the first plurality of configurations. Upon receiving approval of the first plan, the method includes implementing the first plan by, for each respective configuration of the first plurality of configurations: identifying a respective corresponding service for the respective configuration, and modifying a configuration of the respective corresponding service based on the respective configuration. Additionally, upon completing implementation of the first plan, the method includes labeling each of the first plurality of configurations with a production identifier.

According to a second embodiment of the present disclosure, a computer-readable storage medium is provided. The computer-readable storage medium contains computer program code that, when executed by operation of one or more computer processors, performs an operation. The operation includes receiving a first plurality of configurations, wherein each of the first plurality of configurations corresponds to a respective service and is associated with a first plan. The operation further includes storing the first plurality of configurations, in association with the first plan, without implementing the first plurality of configurations. Upon receiving approval of the first plan, the operation includes implementing the first plan by, for each respective configuration of the first plurality of configurations: identifying a respective corresponding service for the respective configuration, and modifying a configuration of the respective corresponding service based on the respective configuration. Additionally, upon completing implementation of the first plan, the operation includes labeling each of the first plurality of configurations with a production identifier.

According to a third embodiment of the present disclosure, a system is provided. The system includes one or more computer processors, and a memory containing a program which, when executed by the one or more computer processors, performs an operation. The operation includes receiving a first plurality of configurations, wherein each of the first plurality of configurations corresponds to a respective service and is associated with a first plan. The operation further includes storing the first plurality of configurations, in association with the first plan, without implementing the first plurality of configurations. Upon receiving approval of the first plan, the operation includes implementing the first plan by, for each respective configuration of the first plurality of configurations: identifying a respective corresponding service for the respective configuration, and modifying a configuration of the respective corresponding service based on the respective configuration. Additionally, upon completing implementation of the first plan, the operation includes labeling each of the first plurality of configurations with a production identifier.

DETAILED DESCRIPTION

Embodiments of the present disclosure provide systems and techniques to manage a staged rollout of configuration modifications in a way that ensure consistency and accuracy, without introducing computational overhead or requiring extensive manual intervention. In one embodiment, techniques described herein provide for management of configurations in various distributed nodes, each of which can be executing or offering any number of services. For example, in one embodiment, each node can correspond to a particular enterprise (e.g., a physical location such as a storefront). In such an embodiment, the services (also referred to as microservices) offered at a given node can include, for example, a sales service, a returns service, an inventory service, and the like. In embodiments, the services offered by a given node may be interrelated or independent with each other and with other nodes. Although storefronts and associated services as used as examples in the present discussion, one of ordinary skill in the art will readily appreciate that embodiments of the present disclosure can be applied in a wide variety of distributed node systems.

In some embodiments, a centralized repository is used to maintain configurations for the nodes, as discussed in more detail below. In embodiments of the present disclosure, all non-transactional data is managed using change plans. In one embodiment, non-transactional data can include relatively stable data such as configurations of the various services. For example, non-transactional data may include the types of payments a given payment service accepts, prices for given items, brands that a given store offers, and the like. In contrast, transactional data can include relatively transitive data such as individual purchase transactions, current inventory numbers, and the like.

In one embodiment, each configuration (or modification or change to configuration) indicates the relevant service(s), along with a label indicating the plan to which the configuration belongs. For example, a first configuration may specify that the set of accepted payment types includes "cash," and the first configuration can be associated with a corresponding plan (e.g., a "cash" plan). Further, a second configuration may specify that cash is not accepted, and this configuration can be assigned to a second plan (e.g., a "no cash" plan). Of course, any number of other configurations, associated with any number of services, may be included in the "cash" plan and/or the "no cash" plan.

In an embodiment, these configurations are maintained without being implemented or applied. That is, the configurations may be reviewed, validated, created, destroyed, and modified without changing the actual configuration of any particular node in the system. In an embodiment, to apply or implement a configuration, a user can specify to roll out the corresponding change plan to one or more specified nodes. For example, the user may indicate to apply the "cash" plan to a first set of nodes, while a second subset of the nodes receive the "no cash" plan. In this way, the user can observe the operations of each node to drive future configuration decisions.

In some embodiments, configurations that are actively applied are labeled with a "null" label or a defined "production" plan, indicating that they are currently in use. In one embodiment, to ensure that configurations cannot be modified without using a change plan, the system prevents direct modification of any data labeled with the null or production plan. To adjust such a configuration, in an embodiment, users define a new change plan (or modify an existing one) with a configuration that is different from the existing production configuration. The user(s) can then validate and implement this plan. Advantageously, some embodiments of the present disclosure provide for change plans that can cover any number of changes across any number of services, and these plans can be implemented on any number of nodes. This allows configurations to be managed simultaneously and precisely.

Figure 1:
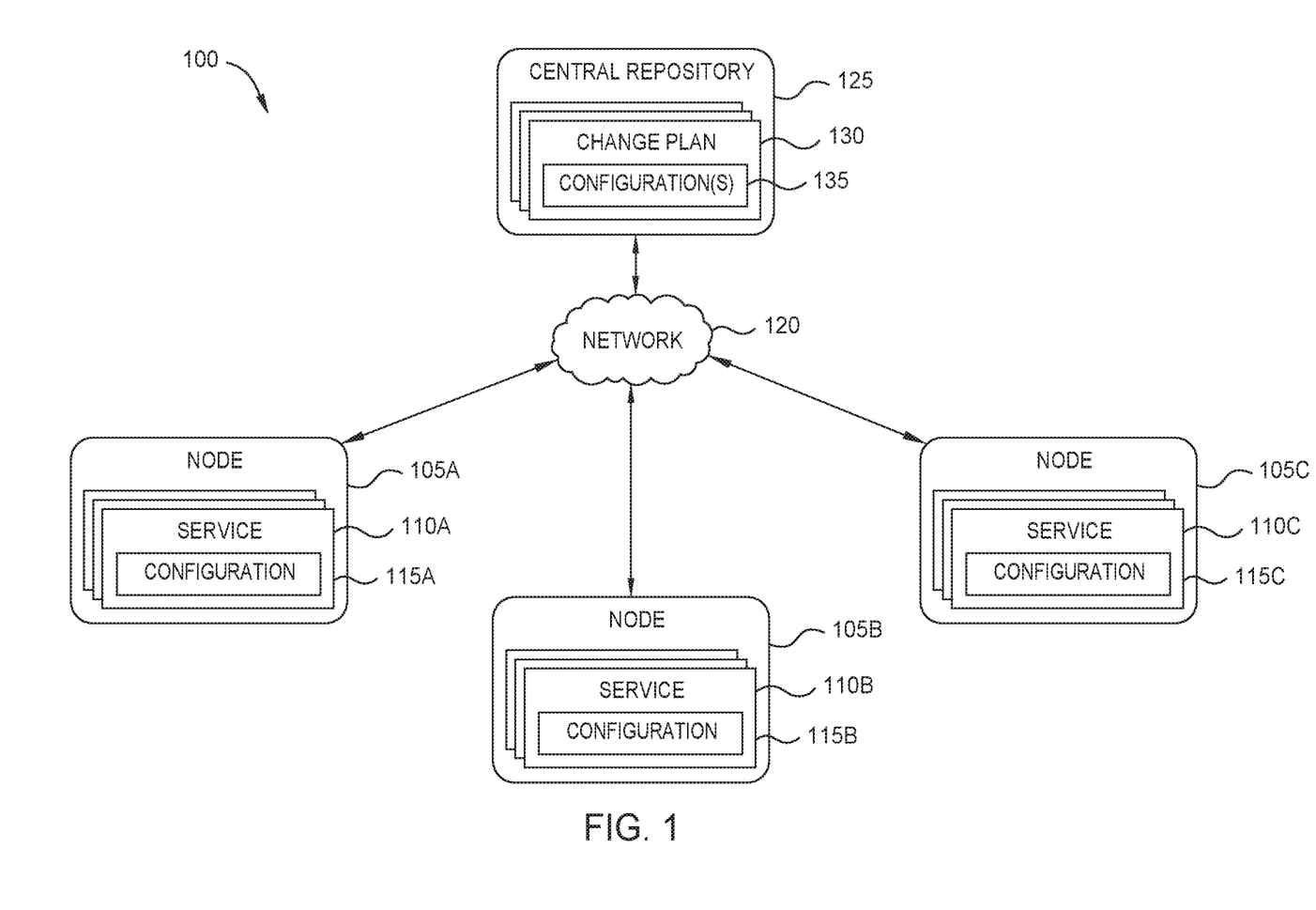
FIG. 1 illustrates a distributed system configured to implement staged rollout of configuration changes, according to one embodiment disclosed herein.

FIG. 1 illustrates a distributed System 100 configured to implement staged rollout of configuration changes, according to one embodiment disclosed herein. In the illustrated embodiment, the System 100 includes a set of Nodes 105A-C, and a Central Repository 125. Although three Nodes 105 are depicted, there may be any number of Nodes 105 in the System 100 in various embodiments. Further, although a Centralized Repository 125 is depicted, in some embodiments, the Change Plans 130 can be maintained in any suitable location, including in one or more Nodes 105. In the illustrated embodiment, each Node 105A-C corresponds to a logically discrete entity or module, such as a physical location or enterprise. For example, in one embodiment, each Node 105 corresponds to a physical storefront, and/or individual point-of-sale terminals in a storefront.

In the illustrated embodiment, the Nodes 105 and Central Repository 125 are communicably coupled via a Network 120, which may include wired connections, wireless connections, or a combination of wired and wireless connections. In at least one embodiment, the Network 120 includes the Internet. As illustrated, each Node 105 offers or includes a corresponding set of one or more Services 110. In an embodiment, each Service 110 corresponds to an application, operation, process, structure, or other similar service. For example, a first Service 110 may correspond to an "inventory" service that is used to track inventory at the Node 105, while a second Service 110 corresponds to a "purchases" service that handles purchase transactions for the Node 105.

In embodiments, each Node 105 may provide some set of overlapping Services 110. That is, each Node 105 may host or provide a respective instance of the same Service 110 (e.g., an instance of the "purchases" service may exist on more than one Node 105). Further, in some embodiments each Node 105 may provide non-overlapping Services 110. For example, Node 105B may provide one or more Services 110 that Node 105A does not, and vice versa. In some embodiments, one or more of the Services 110 may be executed or hosted locally by the Node 105. Similarly, one or more Services 110 for a given Node 105 may be hosted remotely (e.g., in the cloud, or in Central Repository 125) and accessible from the Node 105. In one embodiment, the Services 110 offered by a given Node 105 are defined by various configurations (e.g., specified by a user).

In the illustrated embodiment, each Service 110 is associated with a corresponding Configuration 115. Each Configuration 115 defines the properties or characteristics of its corresponding Service 110. For example, for a purchase Service 110, the Configuration 115 may specify accepted payment types, coupons/discounts, any purchase restrictions (e.g., based on the time and/or the age of the purchaser), and the like. In at least one embodiment, the Configuration 115 of a given Service 110 may differ across the Nodes 105. That is, even for two instances of the same Service 110, the Configuration 115 may differ. For example, the Configuration 115 of the purchase Service 110 at Node 105A may specify that personal checks are accepted, while the Configuration 115 of the purchase Service 110 of Node 105B can specify that personal checks are not accepted.

In some embodiments, the Configurations 115 cannot be directly modified or replaced (e.g., directly by a user at the Node 105). In one such embodiment, all changes to the Configurations 115 are implemented via Change Plans 130. In an embodiment, each Change Plan 130 is generally a collection of Configurations 135 for one or more Services 110. In at least one embodiment, each Configuration 135 is defined as a complete set of settings or other parameters for a given Service 110. In another embodiment, each Configuration 135 can be defined as a set of changes to make to one or more existing Configurations 115 deployed or in production on one or more Nodes 105. For example, a given Change Plan 130 may include a Configuration 135 specifying that the purchases Service 110 is to be modified such that cash is accepted, regardless of the other settings or parameters of the Service 110.

In one embodiment, each Change Plan 130 is associated with a unique identifier, and the set of pending or planned Configurations 135 corresponding to a given Change Plan 130 include an indication of this identifier. For example, in one embodiment, each Configuration 135 includes a set of fields specifying various aspects of the change (such as the Service(s) 110 involved, the parameter(s) being changed, the new value(s) for these parameters, and the like), with at least one field storing the unique identifier of the corresponding Change Plan 130. In this way, the set of Configurations 135 can be queried based on the Change Plan(s) 130 they belong to.

In some embodiments, the Configurations 135 are stored in the same repository as deployed Configurations 115. In one such embodiment, deployed or active Configurations 115 are labeled with a null or empty identifier, or another unique value indicating that the configuration is in production. This allows the active configurations to be distinguished from pending configurations. In at least one embodiment, the Central Repository 125 allows users to modify or otherwise access the set of Configurations 135. To prevent tampering with deployed configurations, the Central Repository determines whether the selected configuration is labeled as "production," null, or otherwise associated with an identifier indicating it cannot or should not be modified. If so, the system can reject the changes. In this way, the user is forced to use Change Plans 130 and pending Configurations 135 to modify deployed Configurations 115.

In some embodiments, when the user is satisfied with the Change Plan 130, they can deploy it and/or set it for review. In some embodiments, reviewing the Change Plan 130 includes labeling each included Configuration 135 as "in review" or with some other identifier that prevents modification. The system and/or users can then review the entire plan holistically. Advantageously, because a given Change Plan 130 can affect any number of Services 110 on any number of Nodes 105, the presently disclosed embodiments enable users to evaluate the entire set of changes as a unit, without risking premature, inconsistent, or accidental modifications to the Services 110 currently deployed in production.

In an embodiment, once the Change Plan 130 passes review, it can be deployed to one or more Nodes 105 (e.g., selected by a user). This causes the Configurations 115 of the selected Node(s) 105 to be updated to reflect the Configurations 135 of the Change Plan 130. In some embodiments, the Configurations 135 are re-labeled to indicate that they are deployed/in production. This prevents them from being directly modified, as discussed above.

Figure 2:
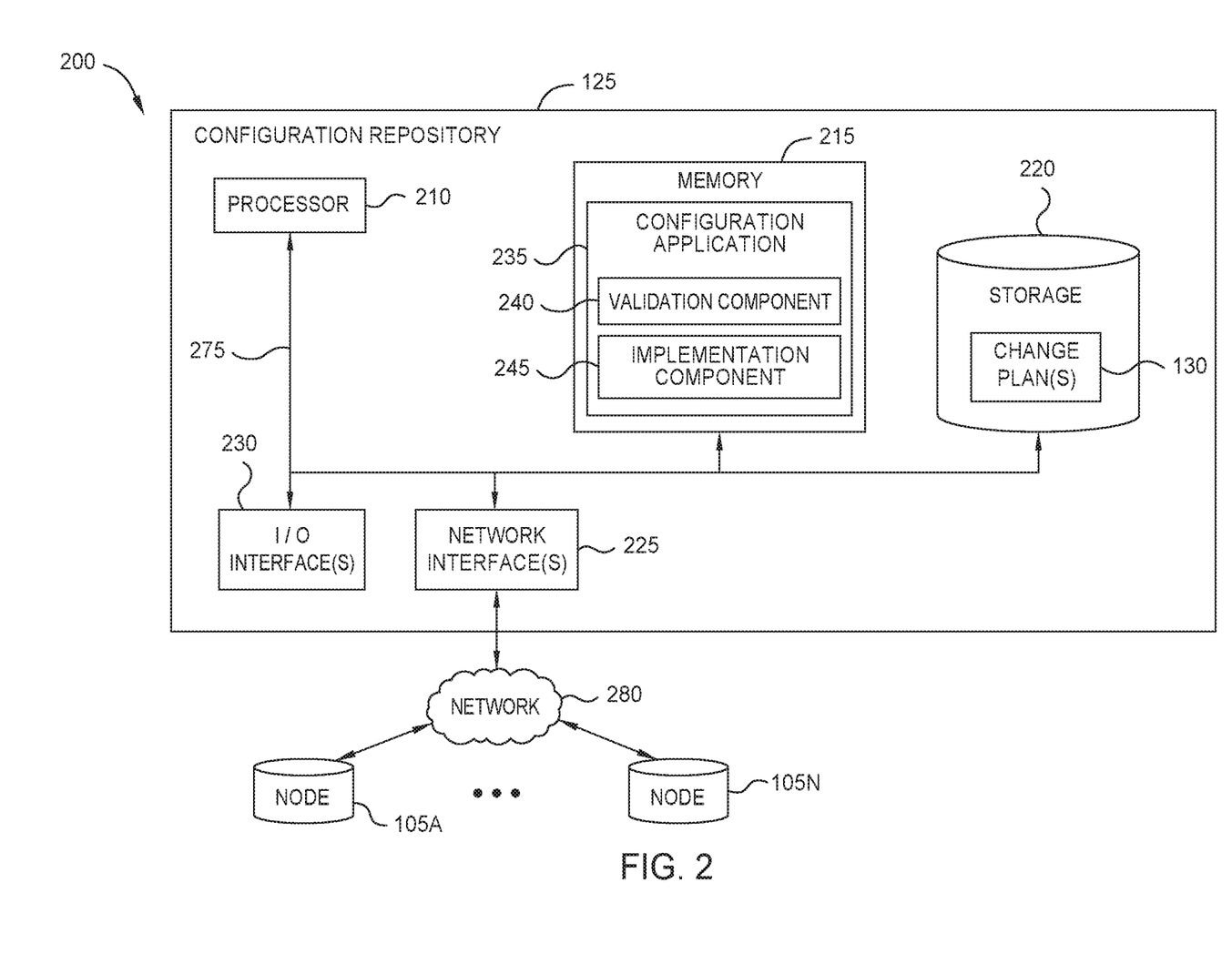
FIG. 2 is a block diagram illustrating a centralized configuration repository, according to one embodiment disclosed herein.

FIG. 2 is a block diagram illustrating a centralized Configuration Repository 125, according to one embodiment disclosed herein. Although depicted as a physical device, in embodiments, the Configuration Repository 125 may be implemented using virtual device(s), and/or across a number of devices (e.g., in a cloud environment). As illustrated, the Configuration Repository 125 includes a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface 225, the Configuration Repository 125 can be communicatively coupled with one or more other devices and components (e.g., via the Network 280, which may include the Internet, local network(s), and the like). As illustrated, the Processor 210, Memory 215, Storage 220, Network Interface(s) 225, and I/O Interface(s) 230 are communicatively coupled by one or more Buses 275. In the illustrated embodiment, the Configuration Repository 125 is communicatively linked to each Node 105A-N.

In the illustrated embodiment, the Storage 220 includes a set of Change Plans 130. Although depicted as residing in Storage 220, in embodiments, the Change Plans 130 may reside in any suitable location. For example, in some embodiments, the Change Plans 130 are stored locally by one or more of the Nodes 105. In another embodiment, the Change Plans 130 are mirrored or synchronized across multiple Nodes 105 and/or the Configuration Repository 125. As discussed above, in an embodiment, each Change Plan 130 includes a set of configurations (and/or configuration changes) that are being evaluated, tested, or are otherwise pending (e.g., not currently deployed).

As illustrated, the Memory 215 includes a Configuration Application 235. Although depicted as software residing in Memory 215, in embodiments, the Configuration Application 235 may be implemented using hardware, software, or a combination of hardware and software. The Configuration Application 235 includes a Validation Component 240 and an Implementation Component 245. Although depicted as discrete components for conceptual clarity, in embodiments, the operations of the Validation Component 240 and Implementation Component 245 may be combined or distributed across any number of components.

In an embodiment, the Validation Component 240 generally validates configuration changes (e.g., Change Plans 130) prior to them being stored and/or implemented. In one embodiment, this includes receiving input from users (e.g., queries to identify configuration(s) and/or change(s), requests to modify configuration(s) and/or plan(s), and the like) and validating the input before performing the action. For example, the Validation Component 240 may determine whether the change being requested affects a configuration labeled as "deployed," "production," or otherwise indicated as being unmodifiable.

If the Validation Component 240 determines that the change affects a locked configuration (e.g., one labeled with a null or other production identifier, and/or one labeled as under review), the Validation Component 240 can block the change. In some embodiments, the Validation Component 240 prompts the user to instead define a new Change Plan 130 including the change(s), or to select an existing (modifiable) Change Plan 130 to add the change(s) to.

In some embodiments, the Validation Component 240 also performs validation of Change Plans 130 that have been moved to an "under review" stage. For example, the Validation Component 240 may, for each configuration change indicated in the Change Plan 130, identify the Service(s) 110 and/or Node(s) 105 that will be affected, and confirm that the change can be successfully implemented and does not conflict with any other requirements. For example, the Validation Component 240 may confirm that the indicated Node(s) 105 are offering (and/or are capable of offering) the implicated Service(s) 110, that the indicated parameters or values in the configuration are acceptable or allowable (e.g., within predefined bounds), and the like.

Generally, the Validation Component 240 confirms that the Change Plan 130 can be successfully implemented or deployed, without actually deploying it. That is, the Validation Component 240 does not modify the actual configurations of the Nodes 105. The Validation Component 240 can then report the results of its evaluation (e.g., to a user) to allow them to approve the Change Plan 130, modify the plan to resolve potential issues, and the like.

In an embodiment, the Implementation Component 245 deploys Change Plans 130 into production. In some embodiments, the Implementation Component 245 first confirms that the Change Plan 130 has successfully passed review by the Validation Component 240. If not, the Implementation Component 245 rejects the request. If the Change Plan 130 has been successfully evaluated, in one embodiment, the Implementation Component 245 applies the indicated configuration changes across the one or more relevant Nodes 105.

In some embodiments, user(s) can indicate which Node(s) 105 the Change Plan 130 should be deployed to. In some embodiments, some or all of the configurations are stored locally at the Configuration Repository 125, and each Node 105 can check with the Central Repository 125 to identify and retrieve which configuration(s) it should be using (e.g., by querying the Central Repository 125 for configurations flagged as "production"). These configurations may then be copied or replicated to the Node 105. In one such embodiment, to implement the Change Plan 130, the Implementation Component 245 relabels the configuration(s) included in the Change Plan 130 with the "production" identifier. For example, the Implementation Component 245 may remove the identifier of the Change Plan 130 from each configuration, and add the identifier of the production set (or set the value to null, depending on the particular implementation).

In some embodiments, the Implementation Component 245 can further indicate, to each relevant Node 105, that an updated configuration is available. In this way, the Change Plan 130 is simultaneously deployed to the selected Node(s) 105. Advantageously, a given Change Plan 130 can include a number of changes, each affecting any number of Services 110, across any number of Nodes 105. By utilizing Change Plans 130, embodiments of the present disclosure enable configuration changes for disparate services and nodes to be implemented synchronously.

Figure 3:
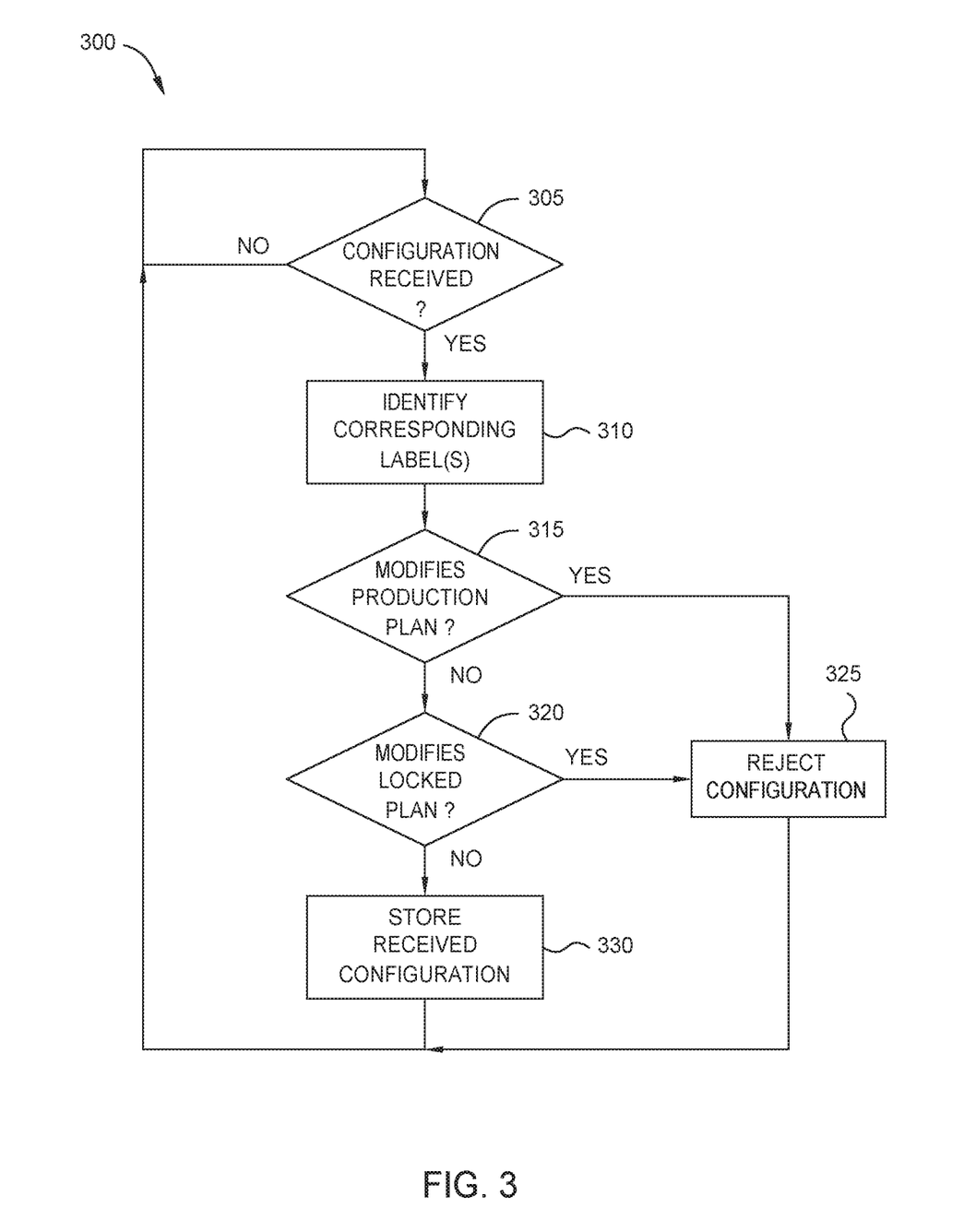
FIG. 3 is a flow diagram illustrating a method for evaluating and maintaining configuration changes, according to one embodiment disclosed herein.

FIG. 3 is a flow diagram illustrating a method 300 for evaluating and maintaining configuration changes, according to one embodiment disclosed herein. The method 300 begins at block 305, where the Configuration Application 235 determines whether the system has received a new configuration, and/or a modification to an existing configuration (e.g., from a user). In some embodiments, as discussed above, the configuration generally includes specified settings, parameters, or other elements for one or more services. In some embodiments, users and administrators can submit and modify configurations using one or more terminals located in a central location, at one or more of the nodes, and the like.

If no configuration (or modification) has been received, in the illustrated embodiment, the method 300 loops at block 305. When a new configuration or modification is received, the method 300 proceeds to block 310, where the Configuration Application 235 identifies the label(s) or identifiers associated with, attached to, or otherwise corresponding to the received and/or indicated configuration(s). As discussed above, in some embodiments, each configuration in the repository (or received from a user) includes a field indicating the plan or set that the configuration belongs to. For example, in some embodiments, the field indicates a unique identifier of the Change Plan 130 to which the configuration belongs.

In one embodiment, there is a predefined identifier associated with production, indicating that the configuration is deployed to at least one Node 105 (or, in the case of a new configuration, indicating that the configuration should be deployed to at least one Node 105). In at least one embodiment, the identifier is set to a null value to indicate that the configuration does not belong to any Change Plan 130 because it is currently implemented. In some embodiments, if the configuration is currently deployed (or is being deployed), the plan identifier (or some other field) indicates which Node(s) 105 the configuration is active on.

After identifying the value of the plan identifier, the method 300 continues to block 315, where the Configuration Application 235 determines whether the received input is attempting to modify the production plan. For example, if the received input is a new configuration, the Configuration Application 235 determines whether the label indicates the production plan (e.g., indicating that the user is attempting to directly implement the change). In the case that the input is modifying an existing configuration, the Configuration Application 235 determines whether the modified configuration(s) are currently deployed in production.

If the input would modify the production set, the method 300 proceeds to block 325, where the Configuration Application 235 rejects the configuration. In embodiments, as discussed above, the Configuration Application 235 requires all changes to the deployed configurations to be accomplished via a Change Plan 130. Thus, if the input is either adding a new configuration with the "production" label or is modifying an existing configuration with the "production" label, the Configuration Application 235 rejects the input.

In some embodiments, the Configuration Application 235 prompts the user to create a new Change Plan 130 (or to select an existing Change Plan 130) to include the proposed changes. This allows them to proceed through the allowable workflow, in order to ensure the integrity and consistency of the system. The method 300 then returns to block 305, to await additional input.

Returning to block 315, if the Configuration Application 235 determines (based on the plan identifier) that the input is not modifying the deployed production set, the method 300 continues to block 320. At block 320, the Configuration Application 235 determines whether the input is attempting to modify a Change Plan 130 that is currently locked (e.g., designated as "under review"). That is, the Configuration Application 235 determines whether the input is a new configuration labeled with a locked Change Plan 130, and/or whether the input is accessing and modifying an existing configuration file that is labeled with a locked Change Plan 130.

As discussed above, in some embodiments, Change Plans 130 can be locked for a variety of reasons, including because they are being reviewed/validated (by the Configuration Application 235 and/or by users), because they are currently being deployed, and the like. If the Configuration Application 235 determines that the input modifies a locked Change Plan 130, the method 300 proceeds to block 325, where the Configuration Application 235 again rejects the input and informs the user. As above, in some embodiments, the Configuration Application 235 prompts the user to create a new Change Plan 130 and/or modify another (unlocked) plan. The method 300 then returns to block 305.

Returning to block 320, if the Configuration Application 235 determines that the input does not modify a locked plan, the method 300 proceeds to block 330, where the Configuration Application 235 stores the received configuration in the configuration repository. In some embodiments, as discussed above, the configurations are stored in a central repository that is accessible from one or more of the Nodes 105 and/or from other locations (e.g., from a terminal at each physical enterprise). In one embodiment, all configurations, whether they are currently deployed, under review, or simply pending, are maintained in the repository.

In an embodiment, the Configuration Application 235 stores the configuration with an indication of the Change Plan 130 it belongs to. In this way, it can be queried and searched for, as well as distinguished from the currently deployed set of configurations, and from other Change Plans 130. Notably, in an embodiment, the configuration is stored without being implemented or deployed to any of the Nodes 105. That is, even if the configuration is stored in the same repository as the existing deployed plan, the configuration of the Nodes 105 is not modified. The method 300 then returns to block 305.

Figure 4:
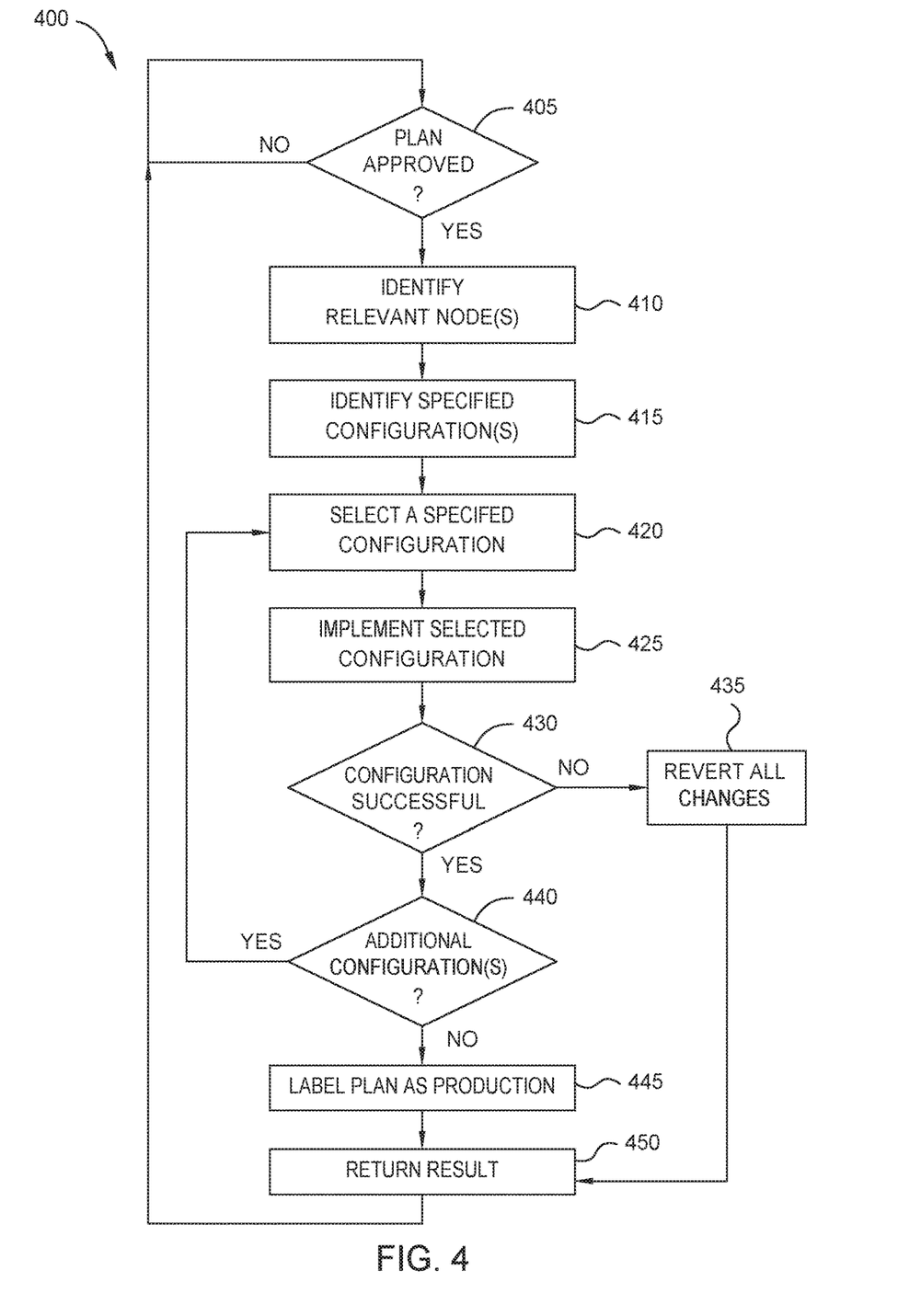
FIG. 4 is a flow diagram illustrating a method for implementing configuration changes, according to one embodiment disclosed herein.

FIG. 4 is a flow diagram illustrating a method 400 for implementing configuration changes, according to one embodiment disclosed herein. The method 400 begins at block 405, where the Configuration Application 235 determines whether one or more Change Plans 130 have been approved (e.g., by a user). In some embodiments, the Change Plan 130 must be reviewed before it can be implemented. In one such embodiment, the Configuration Application 235 determines whether the plan has passed review. In another embodiment, as part of the approval process, the Configuration Application 235 reviews and validates the plan.

In an embodiment, the Configuration Application 235 validates the plan by confirming that it can be implemented. This may include, for example, confirming that the indicated configuration changes are within allowable or predefined limits or boundaries, that the service(s) to be modified are actually deployed at the indicated Node(s) 105 (or can be deployed there), that the plan does not include contradictory or conflicting changes (e.g., a first change indicating that profits are to be calculated daily, and a second change indicating that profits should be calculated weekly), and the like. If the plan fails this validation, the Configuration Application 235 can decline to implement it.

In the illustrated embodiment, if a Change Plan 130 has been approved (and has passed validation, if applicable), the method 400 proceeds to block 410, where the Configuration Application 235 identifies the relevant Node(s) 105 for the plan. As discussed above, in some embodiments, when rolling out a Change Plan 130, the user can select one or more Nodes 105 where the plan should be implemented. In one embodiment, the user uses a graphical user interface (GUI) to select the relevant Nodes 105.

At block 415, the Configuration Application 235 identifies the configuration(s) and/or change(s) indicated in the approved Change Plan 130, and, at block 420, the Configuration Application 235 selects one of these identified configurations. The method 400 then continues to block 425, where the Configuration Application 235 implements the selected configuration. In one embodiment, this includes changing the label of the configuration to the "production" set (e.g., a null value). In another embodiment, the Configuration Application 235 refrains from changing the label until the entire plan has been fully implemented.

In some embodiments, the Configuration Application 235 implements the selected configuration by transmitting it to the relevant Node(s) 105 and instructing them to apply it. At block 430, the Configuration Application 235 determines whether the implementation was successful. For example, if one or more of the Node(s) 105 could not be reached or did not respond (or responded indicating that the configuration failed), the Configuration Application 235 can determine that the configuration was not successfully implemented on at least one Node 105.

If the configuration failed for any Node 105, the method 400 proceeds to block 435. At block 435, the Configuration Application 235 reverts any changes that have already been successfully made as part of the Change Plan 130. That is, in the illustrated embodiment, even if all configurations in the Change Plan 130 were successfully implemented on every Node 105, other than a single change on a single Node 105, the Configuration Application 235 will revert these changes to roll back the entire Change Plan 130. In this way, the Configuration Application 235 ensures that no modifications are made to the deployed configurations unless the entire Change Plan 130 can be implemented. The method 435 then proceeds to block 450.

Returning to block 430, if the selected change was successfully implemented, the method 400 continues to block 440, where the Configuration Application 235 determines whether there is at least one additional configuration change to be made. If so, the method 400 returns to block 420. Otherwise, the method 400 proceeds to block 445. At block 445, the Configuration Application 235 labels the approved Change Plan 130 with the production identifier. In one embodiment, this includes changing the plan identifier of each configuration in the plan to a null value, or some other predefined value indicating that the configuration is actively deployed. This prevents the configuration(s) from being modified in the future, without proceeding through a new Change Plan 130.

The method 400 then proceeds to block 450, where the Configuration Application 235 returns the results to the user(s). For example, if the implementation was successful, the Configuration Application 235 can indicate this to the user. If the implementation was rolled back, the Configuration Application 235 can indicate which configuration(s) and/or Node(s) 105 did not complete successfully. In this way, the user can modify the Change Plan 130 to succeed, remove the failed Node(s) 105 from the change plan rollout, and the like. The method 400 then returns to block 405.

In some embodiments, the Configuration Application 235 provides inheritance or other relationships between Change Plans 130. For example, in one such embodiment, two or more Change Plans 130 can be indicated as connected, linked, co-pending, and the like. In an embodiment, if any of these linked Change Plans 130 is transitioned to "review" or "production," the other linked Change Plans 130 are similarly locked for review and/or deployment.

In some embodiments, Change Plans 130 can inherit from other plans. If a first Change Plan 130 inherits from a second, the Configuration Application 235 can apply this inheritance during deployment and/or review. For example, in one embodiment, if the first Change Plan 130 is approved to be deployed, the Configuration Application 235 can first validate and deploy the second Change Plan 130 from which the approved plan inherits. Notably, in some embodiments, if the second plan is approved, it can be implemented without deploying or modifying the first plan.

Figure 5:
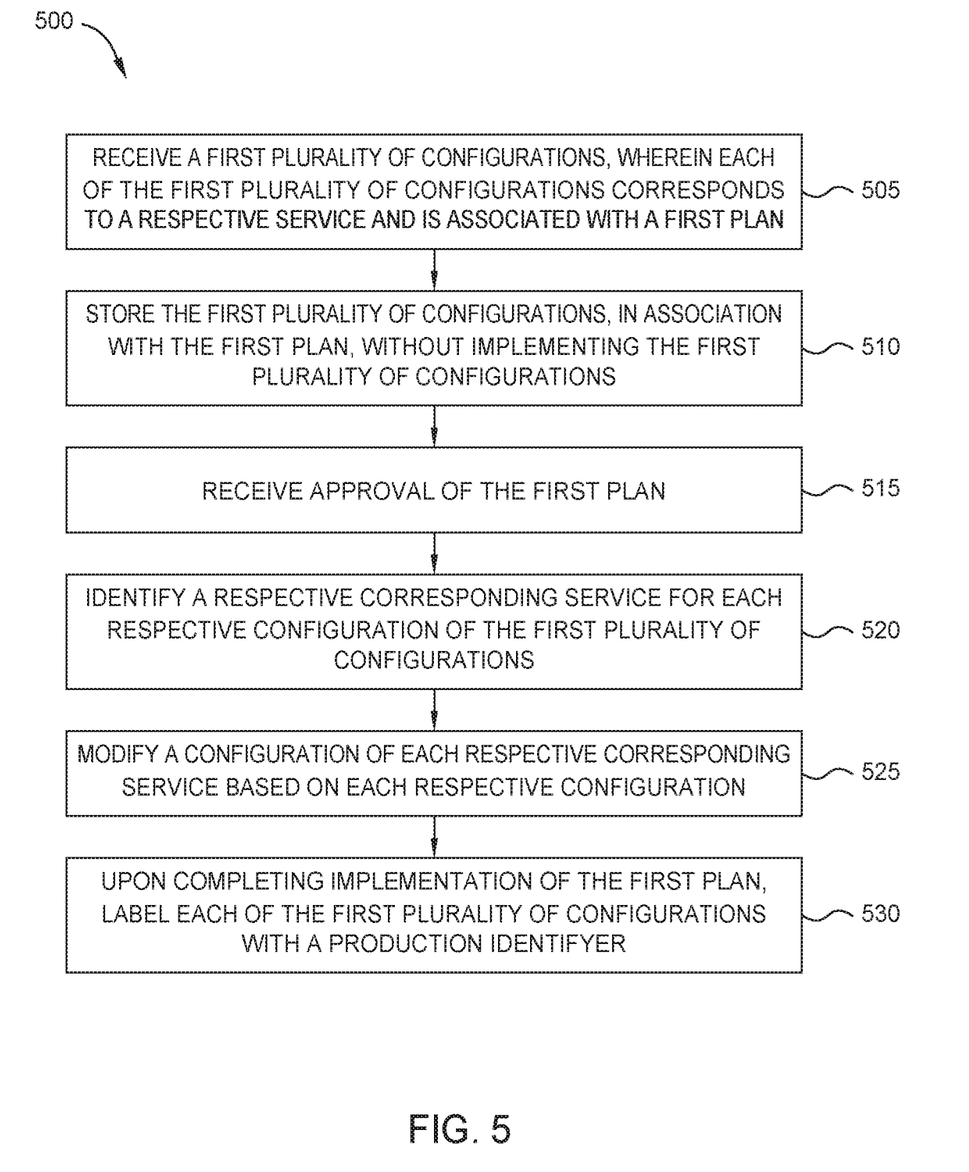
FIG. 5 is a flow diagram illustrating a method for managing configuration modifications, according to one embodiment disclosed herein.

FIG. 5 is a flow diagram illustrating a method 500 for managing configuration modifications, according to one embodiment disclosed herein. The method 500 begins at block 505, where a Configuration Application 235 receives a first plurality of configurations, wherein each of the first plurality of configurations corresponds to a respective service and is associated with a first plan. At block 510, the Configuration Application 235 stores the first plurality of configurations, in association with the first plan, without implementing the first plurality of configurations. Additionally, at block 515, the Configuration Application 235 receives approval of the first plan. The method 500 then proceeds to block 520, where the Configuration Application 235 identifies a respective corresponding service for each respective configuration of the first plurality of configurations. At block 525, the Configuration Application 235 modifies a configuration of each respective corresponding service based on each respective configuration. Further, at block 530, upon completing implementation of the first plan, the Configuration Application 235 label each of the first plurality of configurations with a production identifier.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Configuration Application 235) or related data available in the cloud. For example, the Configuration Application 235 could execute on a computing system in the cloud and maintain configurations of the Nodes 105. In such a case, the Configuration Application 235 could evaluate and maintain configurations, and store Change Plans 130 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first plurality of configurations, wherein each of the first plurality of configurations corresponds to a respective service and is associated with a first plan;
storing the first plurality of configurations, in association with the first plan, without implementing the first plurality of configurations, wherein the first plurality of configurations are stored in a centralized repository;
labeling each the first plurality of configurations in the centralized repository with a label of a first unique identifier, wherein the centralized repository includes at least one configuration associated with a second unique identifier;
upon receiving approval of the first plan, implementing the first plan by, for each respective configuration of the first plurality of configurations:
identifying a respective corresponding service for the respective configuration; and
modifying a configuration of the respective corresponding service based on the respective configuration; and
upon completing implementation of the first plan:
indicating that the first plurality of configurations are in production by removing the labels of the first unique identifier in the centralized repository.

2. The method of claim 1, the method further comprising:
outputting, via a graphical user interface (GUI), an indication of a plurality of nodes, wherein each of the plurality of nodes corresponds to a physical enterprise;
receiving, via a graphical user interface, a selected subset of the plurality of nodes; and
implementing the first plan by configuring each node in the selected subset, wherein nodes not included in the selected subset are not modified.

3. The method of claim 2, wherein the first plurality of configurations were received via the graphical user interface from a computing device at one of the plurality of nodes, and wherein the first plurality of configurations are stored in a centralized repository accessible from at least two of the plurality of nodes.

4. The method of claim 1, the method further comprising:
receiving an attempt to modify one or more configurations of the first plurality of configurations; and
upon determining that the first plurality of configurations are labeled with a null identifier, refraining from modifying the one or more configurations.

5. The method of claim 1, the method further comprising:
receiving a second plurality of configurations, wherein each of the second plurality of configurations is associated with a second plan;
storing the second plurality of configurations, in association with the second plan, without implementing the second plurality of configurations; and
upon receiving an indication that the second plan is under review:
labeling each of the second plurality of configurations with a review identifier, such that the second plurality of configurations are not implemented but cannot be modified.

6. The method of claim 1, the method further comprising:
receiving a second plurality of configurations, wherein each of the second plurality of configurations is associated with a second plan;

storing the second plurality of configurations, in association with the second plan, without implementing the second plurality of configurations;
upon receiving approval of the second plan, attempting to implement the second plan;
upon determining that implementation of the second plan cannot be completed:
reverting any configurations of the second plurality of configurations that have been completed; and
returning an error.

7. The method of claim 1, the method further comprising receiving an indication that the first plan inherits from a second plan; and
upon receiving approval of the first plan, prior to implementing the first plan, implementing the second plan.

8. A computer-readable storage medium containing computer program code that, when executed by operation of one or more computer processors, performs an operation comprising:
receiving a first plurality of configurations, wherein each of the first plurality of configurations corresponds to a respective service and is associated with a first plan;
storing the first plurality of configurations, in association with the first plan, without implementing the first plurality of configurations, wherein the first plurality of configurations are stored in a centralized repository;
labeling each the first plurality of configurations in the centralized repository with a label of a first unique identifier, wherein the centralized repository includes at least one configuration associated with a second unique identifier;
upon receiving approval of the first plan, implementing the first plan by, for each respective configuration of the first plurality of configurations:
identifying a respective corresponding service for the respective configuration; and
modifying a configuration of the respective corresponding service based on the respective configuration; and
upon completing implementation of the first plan:
indicating that the first plurality of configurations are in production by removing the labels of the first unique identifier in the centralized repository.

9. The computer-readable storage medium of claim 8, the operation further comprising:
outputting, via a graphical user interface (GUI), an indication of a plurality of nodes, wherein each of the plurality of nodes corresponds to a physical enterprise;
receiving, via a graphical user interface, a selected subset of the plurality of nodes; and
implementing the first plan by configuring each node in the selected subset, wherein nodes not included in the selected subset are not modified.

10. The computer-readable storage medium of claim 9, wherein the first plurality of configurations were received via the graphical user interface from a computing device at one of the plurality of nodes, and wherein the first plurality of configurations are stored in a centralized repository accessible from at least two of the plurality of nodes.

11. The computer-readable storage medium of claim 8, the operation further comprising:
receiving an attempt to modify one or more configurations of the first plurality of configurations; and
upon determining that the first plurality of configurations are labeled with a null identifier, refraining from modifying the one or more configurations.

12. The computer-readable storage medium of claim 8, the operation further comprising:
receiving a second plurality of configurations, wherein each of the second plurality of configurations is associated with a second plan;
storing the second plurality of configurations, in association with the second plan, without implementing the second plurality of configurations; and
upon receiving an indication that the second plan is under review:
labeling each of the second plurality of configurations with a review identifier, such that the second plurality of configurations are not implemented but cannot be modified.

13. The computer-readable storage medium of claim 8, the operation further comprising:
receiving a second plurality of configurations, wherein each of the second plurality of configurations is associated with a second plan;
storing the second plurality of configurations, in association with the second plan, without implementing the second plurality of configurations;
upon receiving approval of the second plan, attempting to implement the second plan;
upon determining that implementation of the second plan cannot be completed:
reverting any configurations of the second plurality of configurations that have been completed; and
returning an error.

14. The computer-readable storage medium of claim 8, the operation further comprising
receiving an indication that the first plan inherits from a second plan; and
upon receiving approval of the first plan, prior to implementing the first plan, implementing the second plan.

15. A system comprising:
one or more computer processors; and
a memory containing a program which when executed by the one or more computer processors performs an operation, the operation comprising:
receiving a first plurality of configurations, wherein each of the first plurality of configurations corresponds to a respective service and is associated with a first plan;
storing the first plurality of configurations, in association with the first plan, without implementing the first plurality of configurations, wherein the first plurality of configurations are stored in a centralized repository;
labeling each the first plurality of configurations in the centralized repository with a label of a first unique identifier, wherein the centralized repository includes at least one configuration associated with a second unique identifier;
upon receiving approval of the first plan, implementing the first plan by, for each respective configuration of the first plurality of configurations:
identifying a respective corresponding service for the respective configuration; and
modifying a configuration of the respective corresponding service based on the respective configuration; and
upon completing implementation of the first plan:
indicating that the first plurality of configurations are in production by removing the labels of the first unique identifier in the centralized repository.

16. The system of claim 15, the operation further comprising:
- outputting, via a graphical user interface (GUI), an indication of a plurality of nodes, wherein each of the plurality of nodes corresponds to a physical enterprise;
- receiving, via a graphical user interface, a selected subset of the plurality of nodes; and
- implementing the first plan by configuring each node in the selected subset, wherein nodes not included in the selected subset are not modified.

17. The system of claim 15, the operation further comprising:
- receiving an attempt to modify one or more configurations of the first plurality of configurations; and
- upon determining that the first plurality of configurations are labeled with a null identifier, refraining from modifying the one or more configurations.

18. The system of claim 15, the operation further comprising:
- receiving a second plurality of configurations, wherein each of the second plurality of configurations is associated with a second plan;
- storing the second plurality of configurations, in association with the second plan, without implementing the second plurality of configurations; and
- upon receiving an indication that the second plan is under review:
    - labeling each of the second plurality of configurations with a review identifier, such that the second plurality of configurations are not implemented but cannot be modified.

19. The system of claim 15, the operation further comprising:
- receiving a second plurality of configurations, wherein each of the second plurality of configurations is associated with a second plan;
- storing the second plurality of configurations, in association with the second plan, without implementing the second plurality of configurations;
- upon receiving approval of the second plan, attempting to implement the second plan;
- upon determining that implementation of the second plan cannot be completed:
    - reverting any configurations of the second plurality of configurations that have been completed; and
    - returning an error.

20. The system of claim 15, the operation further comprising
- receiving an indication that the first plan inherits from a second plan; and
- upon receiving approval of the first plan, prior to implementing the first plan, implementing the second plan.

* * * * *

UNITED STATES PATENT AND TRADEMARK OFFICE
CERTIFICATE OF CORRECTION

PATENT NO. : 11,038,750 B2  
APPLICATION NO. : 16/661673  
DATED : June 15, 2021  
INVENTOR(S) : Zachary M. Darden et al.

Page 1 of 1

It is certified that error appears in the above-identified patent and that said Letters Patent is hereby corrected as shown below:

In the Drawings

On sheet 4 of 5, in Figure 4, reference numeral 420, Line 1, delete "SPECIFED" and insert -- SPECIFIED --, therefor.

On sheet 5 of 5, in Figure 5, reference numeral 530, Line 3, delete "IDENTIFYER" and insert -- IDENTIFIER --, therefor.

In the Specification

In Column 4, Line 27, delete "1056" and insert -- 105B --, therefor.

In the Claims

In Column 14, Line 13, in Claim 1, after "each" insert -- of --.

In Column 15, Line 28, in Claim 8, after "each" insert -- of --.

In Column 16, Line 51, in Claim 15, after "each" insert -- of --.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*